United States Patent [19]
Frey

[11] Patent Number: 5,522,908
[45] Date of Patent: Jun. 4, 1996

[54] FILTER BAG FOR A VACUUM CLEANER

[75] Inventor: Robert A. Frey, Westlake, Ohio

[73] Assignee: HMI Industries, Inc., Cleveland, Ohio

[21] Appl. No.: 249,339

[22] Filed: May 27, 1994

[51] Int. Cl.[6] ................................................. B01D 46/02
[52] U.S. Cl. ............................ 55/309; 55/380; 55/DIG. 2
[58] Field of Search .................................. 55/341.2, 380, 55/381, 382, 309, DIG. 2

[56]  References Cited

U.S. PATENT DOCUMENTS

| | | | |
|---|---|---|---|
| 1,422,105 | 7/1922 | Kirby | 55/380 |
| 2,327,225 | 8/1943 | Taylor | 55/380 |
| 2,620,045 | 12/1952 | Binggely | 55/380 |
| 3,364,663 | 1/1968 | Lagerstrom | 55/380 |
| 3,971,643 | 7/1976 | Hufton | 55/380 |
| 4,116,648 | 9/1978 | Busch | 55/276 |
| 4,119,414 | 10/1978 | Smaling | 55/DIG. 2 |

FOREIGN PATENT DOCUMENTS 229051  1/1959  Australia ................. 55/380

Primary Examiner—Jay H. Woo
Assistant Examiner—Duane S. Smith
Attorney, Agent, or Firm—Vickers, Daniels & Young

[57]  ABSTRACT

A vacuum cleaner filter bag having multiple, nested inner bags and an outer bag for sequentially filtering a discharge from a vacuum cleaner, wherein each of the inner bags is adapted to cease filtering the discharge therethrough when the bag has become clogged with particulate matter. Each inner bag is designed to rupture, when clogged, in a manner to allow the discharge to bypass that bag and directly enter the next bag.

19 Claims, 7 Drawing Sheets

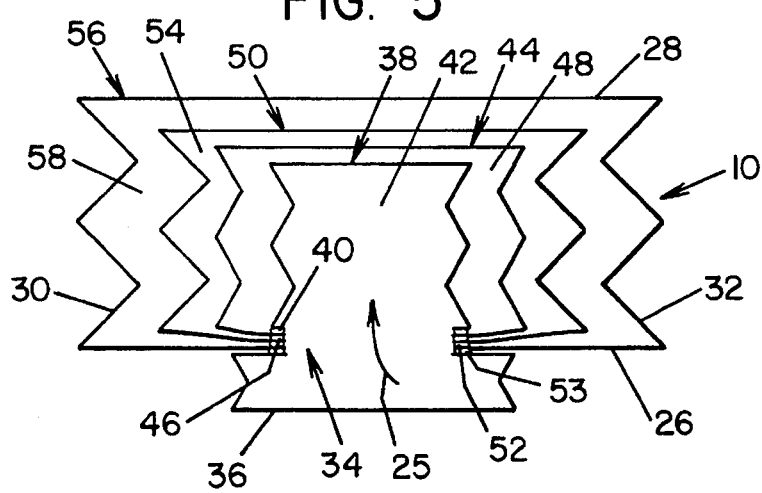
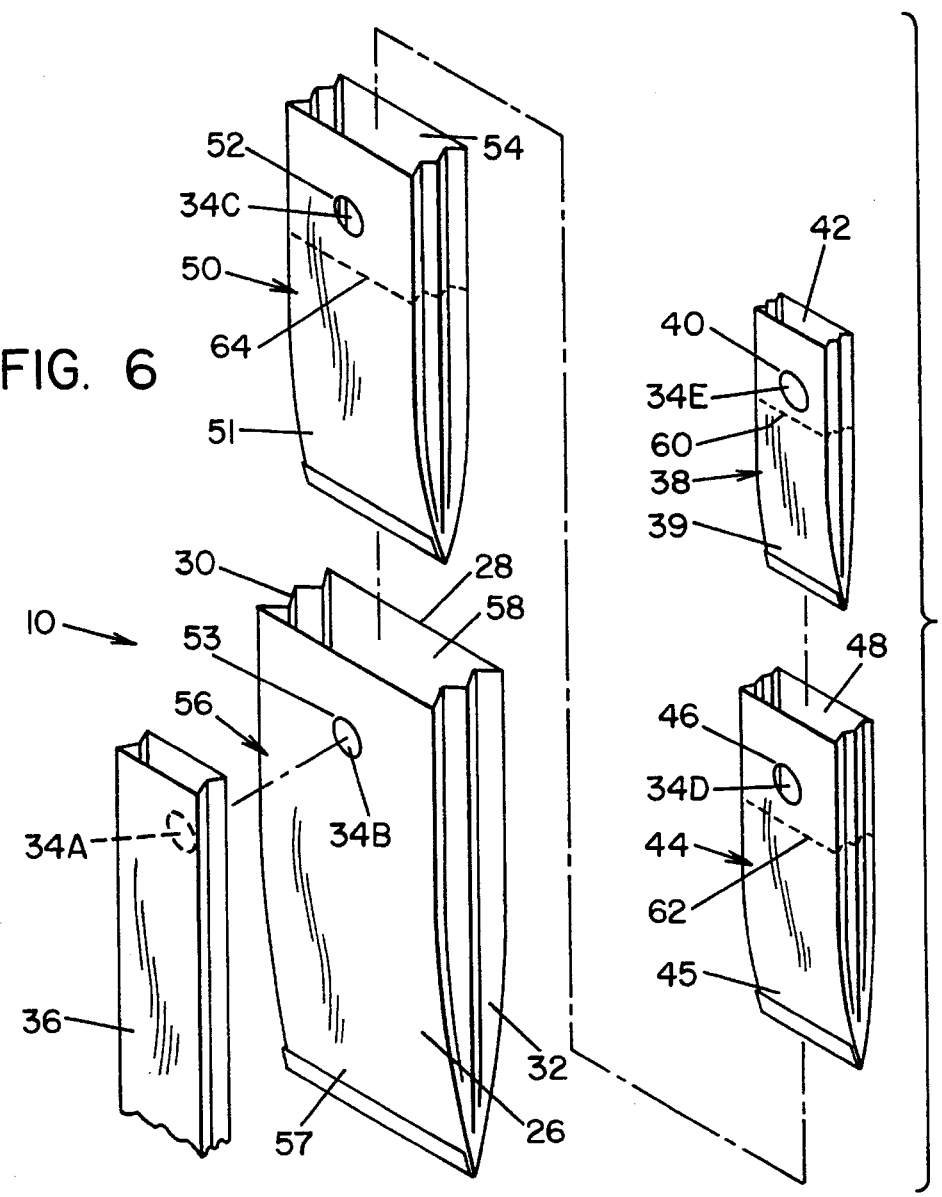

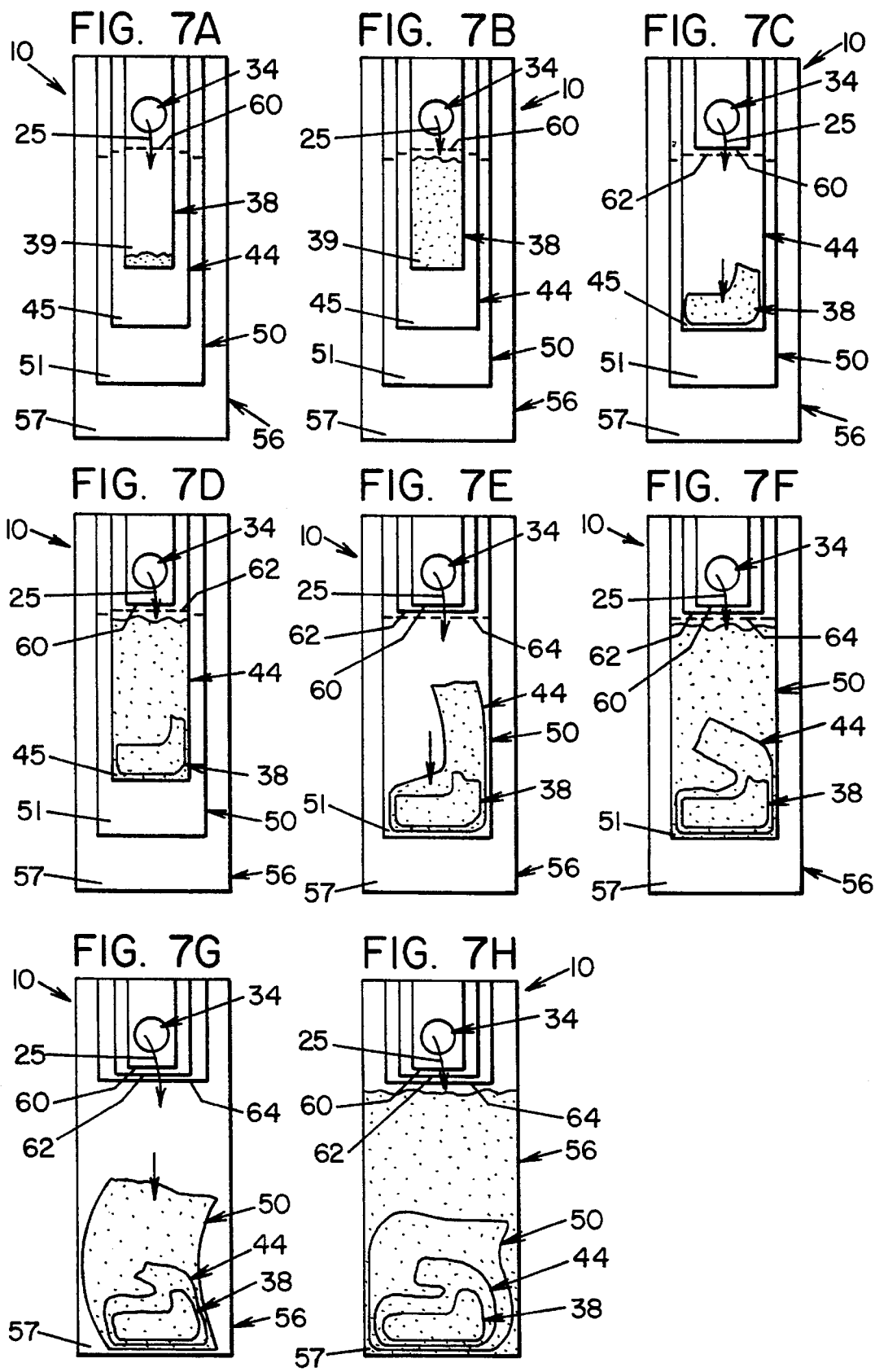

FILTER BAG FOR A VACUUM CLEANER

The present application is directed toward a filter bag for a vacuum cleaner and more particularly toward a filter bag having multiple bag elements suitable for use in an upright vacuum cleaner.

BACKGROUND

It is well known in the art to equip vacuum cleaners with filter bags for filtering dust and dirt particles out of a particle laden air stream created by a vacuum cleaner blower. These filter bags may comprise a single bag element or multiple bag elements of a porous paper or fiber material defining a matrix which traps particulate matter suspended in the air stream while allowing clean air to pass through each bag element and into the environment. Such filter bags are generally disposable and may be detached from a vacuum cleaner and discarded when they have become full of dirt or the openings therethrough have become clogged with dirt.

The efficiency of a vacuum cleaner is affected, in part, by the resistance to air flow imposed by the vacuum cleaner filter bag attached thereto. The more porous the bag elements of the filter bag, the less effort is needed to force air through the filter bag to filter particulate matter from the air. However, if a bag element is too porous, much of the dirt and dust picked up by the vacuum cleaner will pass through the bag element or elements and return to the environment, thus reducing the utility and efficiency of the vacuum cleaner. If bag elements with a tight fiber matrix are used, however, a great amount of force will be needed by the vacuum motor to force air therethrough. Thus, when very tightly woven bag elements are used, the vacuum cleaner must have a fairly powerful motor. Even when a powerful motor is used, its efficiency is decreased by the resistance to air flow imposed by the bag elements of the filter bag. Also, when bag elements having very small openings are employed, these openings quickly become clogged with dirt, decreasing the efficiency of the vacuum and straining the vacuum cleaner motor. Such a filter bag must be replaced frequently adding to the operating cost of the vacuum cleaner. An acceptable balance must therefore be reached between the size of the motor used, the frequency with which the filter bag must be changed, and the percentage of dust and dirt which will be removed from the air by the bag elements. Most attempts to improve vacuum cleaner filter bag design in one of these three areas result in a worsening of the other problems. Thus a filter bag having bag elements with a very fine matrix for use in settings where removing substantially all dust from the discharge is imperative generally must be changed frequently and be used with a vacuum cleaner having a relatively large motor. When a small motor is to be used for reasons of economy, only a lesser degree of dirt removal can be obtained. No known filter bag design adequately addresses all of these problems simultaneously.

SUMMARY OF THE INVENTION

The present invention is directed toward a vacuum cleaner filter bag having multiple bag elements for serially filtering dust and dirt from an air stream flowing through the filter bag, which filter bag is designed to remove a substantial percentage of particulate matter from a particle laden air stream while providing minimal resistance to the flow of air therethrough.

In accordance with this invention, a filter bag having multiple bag elements is provided wherein the air to be cleaned passes serially through an inner bag element, preferably at least one middle bag element, and an outer bag element before being expelled into the environment. The inner bag element is adapted to rupture when it has become clogged with dirt so that it will substantially cease filtering the air and be bypassed when its filtering ability has been diminished, thus preventing the inner bag element from decreasing the efficiency of the other bag elements and the filter bag as a whole. Similarly, the middle bag element or elements include a similar rupture capability for causing that bag element to be removed from the series of bag elements when its efficiency has been reduced by the particulate matter trapped therein. In this manner, each time one of the inner or middle bag elements ruptures, the filter bag will continue to filter with the relatively clean remaining bag elements. A relatively constant degree of filtration is obtained over the life of the filter bag instead of the constantly changing filtration and resistance of a conventional filter bag.

In a first embodiment, the inner bag element and middle bag element or elements are attached to the outer bag element or to the vacuum cleaner discharge tube and all or a portion of each bag is designed to separate from the tube or outer bag element when that bag element has trapped a given amount of dirt. The weight of the trapped particles, the back pressure caused by the dirty bag element or a combination of both factors cause the bag element to detach and drop into the next bag element. This process is repeated as each detachable bag element becomes filled with dirt.

In a second embodiment, the inner bag element includes openings which are sealed shut but are designed to open under the influence of the weight of the trapped dirt or the back pressure or both. These openings allow a substantial amount of the air being cleaned to bypass the clogged bag element and be filtered by the downstream bag elements.

It is therefore a principle object of the subject invention to provide a vacuum cleaner filter bag which efficiently filters particulate matter from a stream of air.

It is another object of the invention to provide a vacuum cleaner filter bag having filtering portions which can be bypassed when they become clogged with dirt and other particulate material to maintain the same overall efficiency of the bag throughout its life.

It is a further object of the present invention to provide a vacuum cleaner filter bag having an improved efficiency over its entire useful life relative to other vacuum cleaner filter bags heretofore available.

It is yet another object of the invention to provide a vacuum cleaner filter bag which provides efficient filtering without requiring frequent replacement.

It is still a further object of the invention to provide a vacuum cleaner filter bag having multiple bag elements for serially filtering dirt in an air stream moving through a vacuum cleaner, which bag elements are sequentially bypassed after they trap a pre-determined amount of dirt.

It is yet a further object of the present invention to provide a disposable vacuum cleaner filter bag which retains within itself expended bag elements.

BRIEF DESCRIPTION OF THE DRAWINGS

These and other objects of the present invention will become apparent from the following brief description of the drawings of which:

FIG. 5 is a top plan view of the filter bag in section taken through line 5—5 in FIG. 3;

FIG. 6 is an exploded perspective view of the filter bag shown in FIG. 2;

FIGS. 7a–7h are a series of front sectional elevational views of the subject filter bag showing the bag elements as they trap progressively more particulate matter and detach from the filter bag; and, FIG. 8 is a front elevation view, partly in section, showing an alternate embodiment of a bag according to the invention.

DETAILED DESCRIPTION OF THE PREFERRED EMBODIMENT

Figure 1:
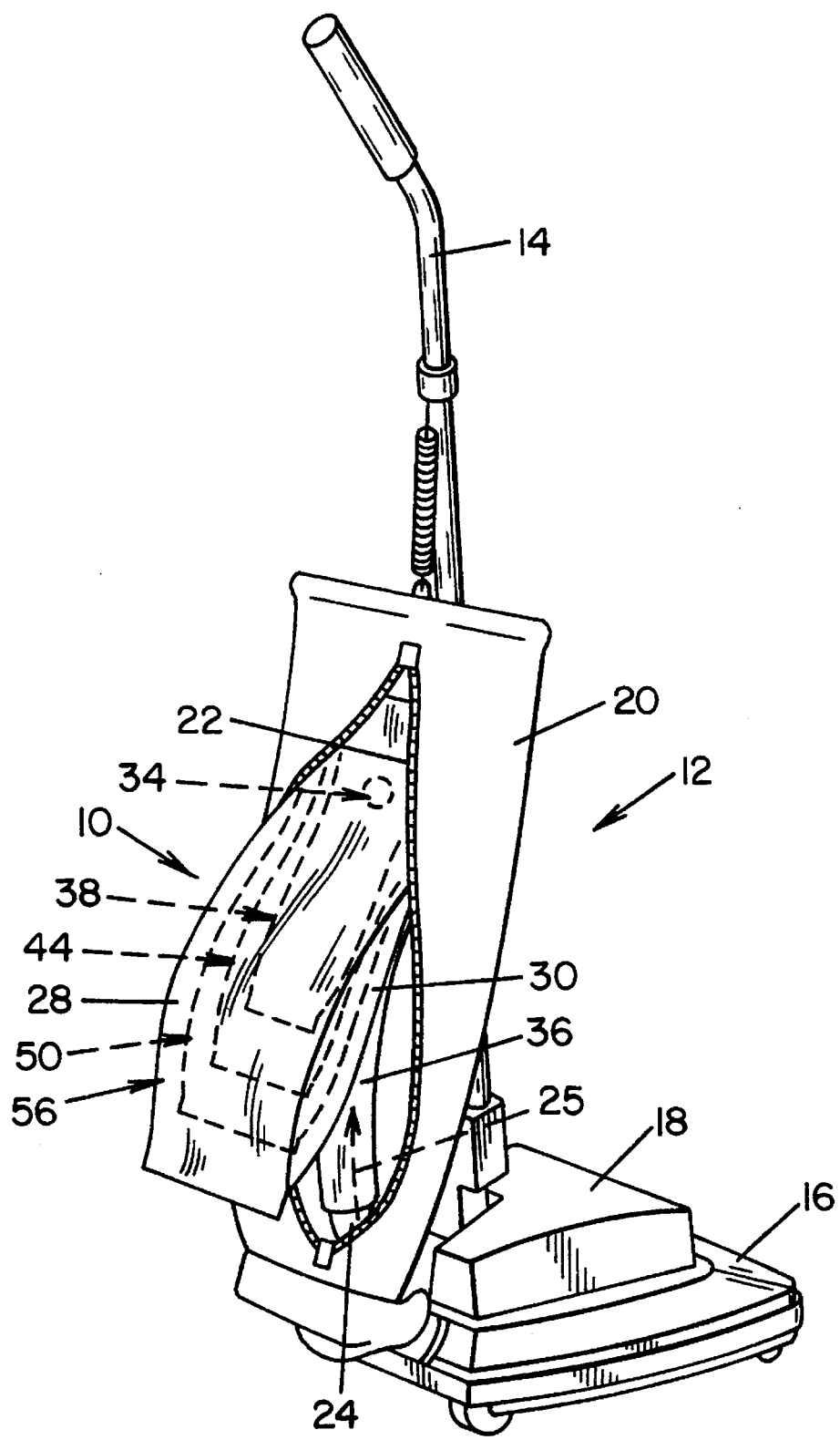
FIG. 1 is a rear perspective view of an upright vacuum cleaner having a filter bag according to the subject invention attached thereto.
Figure 2:
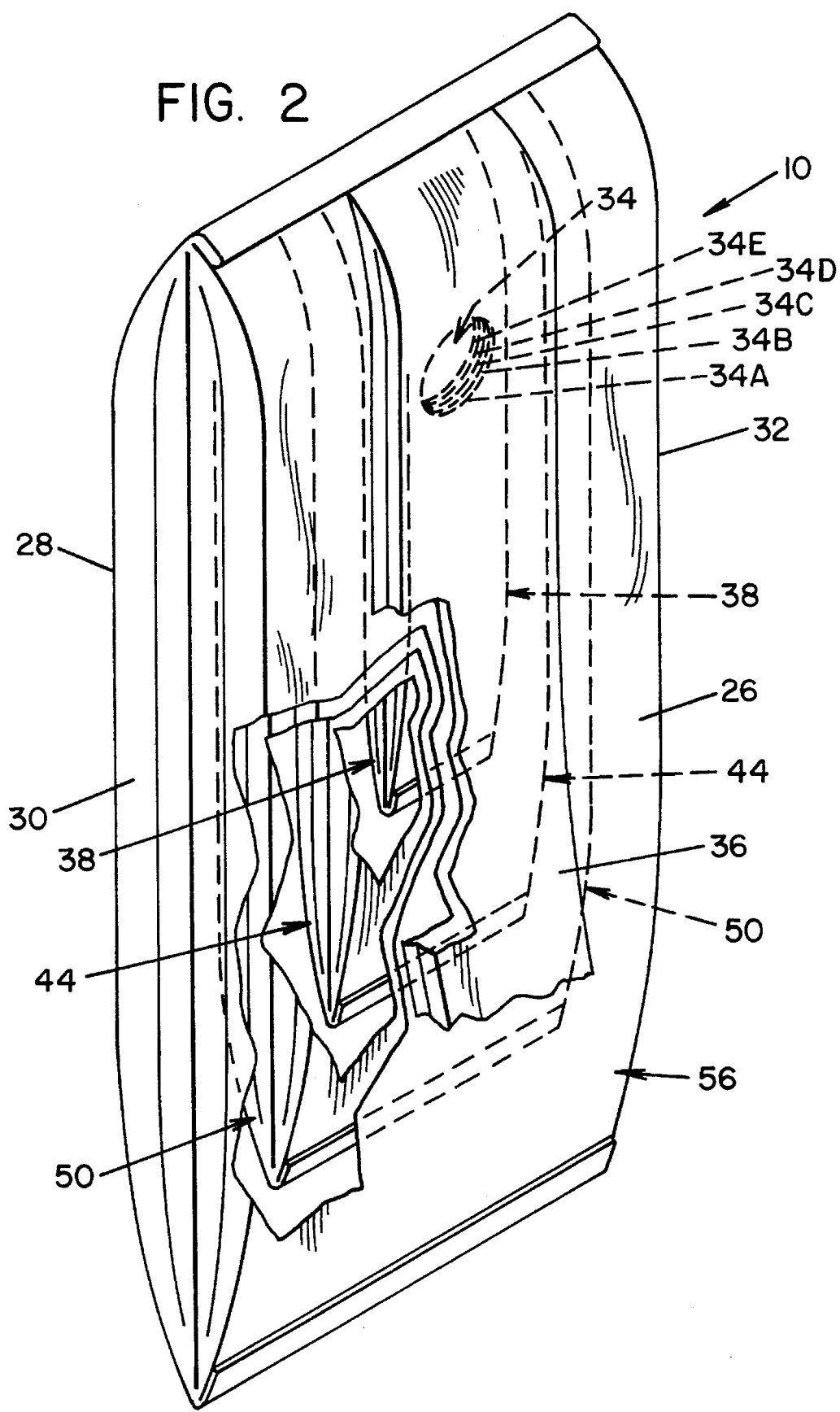
FIG. 2 is a front perspective view partly in section of the filter bag shown in FIG. 1.

Reference is now made to the drawings wherein the showings are for the purpose of illustrating preferred embodiments of the invention only and not for the purpose of limiting the same. FIG. 1 shows a vacuum cleaner bag 10 attached to a vacuum cleaner designated generally by the numeral 12 comprising handle 14, a base 16, a motor housing 18 mounted on base 16 for enclosing a motor (not shown). A bag holder 20 is attached to handle 14 and includes a closable opening 22 therein to allow access to bag 10. A discharge tube 24 is connected to base 16 and serves as a conduit for discharging air and particulate matter therein into bag 10 through opening 34 therein during operation of the vacuum cleaner motor.

As best seen in FIGS. 2–5, filter bag 10 comprises an outer bag 56 having a front wall 26, a rear wall 28, a first side wall 30 and a second side wall 32. Filter bag 10 is connected to discharge tube 24 by a hose element 36 attached to front wall 26 and connectable to discharge tube 24 as shown in FIG. 1. In operation, air and particulate matter are pulled into vacuum cleaner 12 by the vacuum cleaner motor and discharged through discharge tube 24 into hose element 36 and thence through opening 34 into the interior of filter bag 10. As described more fully hereinafter, bag 10 further includes bag elements 38, 44 and 50 inside outer bag 56, and opening 34 comprises opening 34A in hose element 36, opening 34B in bag element 56, opening 34C in bag element 50, opening 34D in bag element 44 and opening 34E in bag element 38. Each bag element of filter bag 10 is preferably made from a weave or matrix of fibrous material so that it is permeable to air and will allow the air entering opening 34 under pressure to pass through its walls while trapping most dirt particles in the bag element. Bag holder 20 also has numerous openings so as not to interfere with the passage of cleaned air from bag 10 to the environment.

Figure 3:
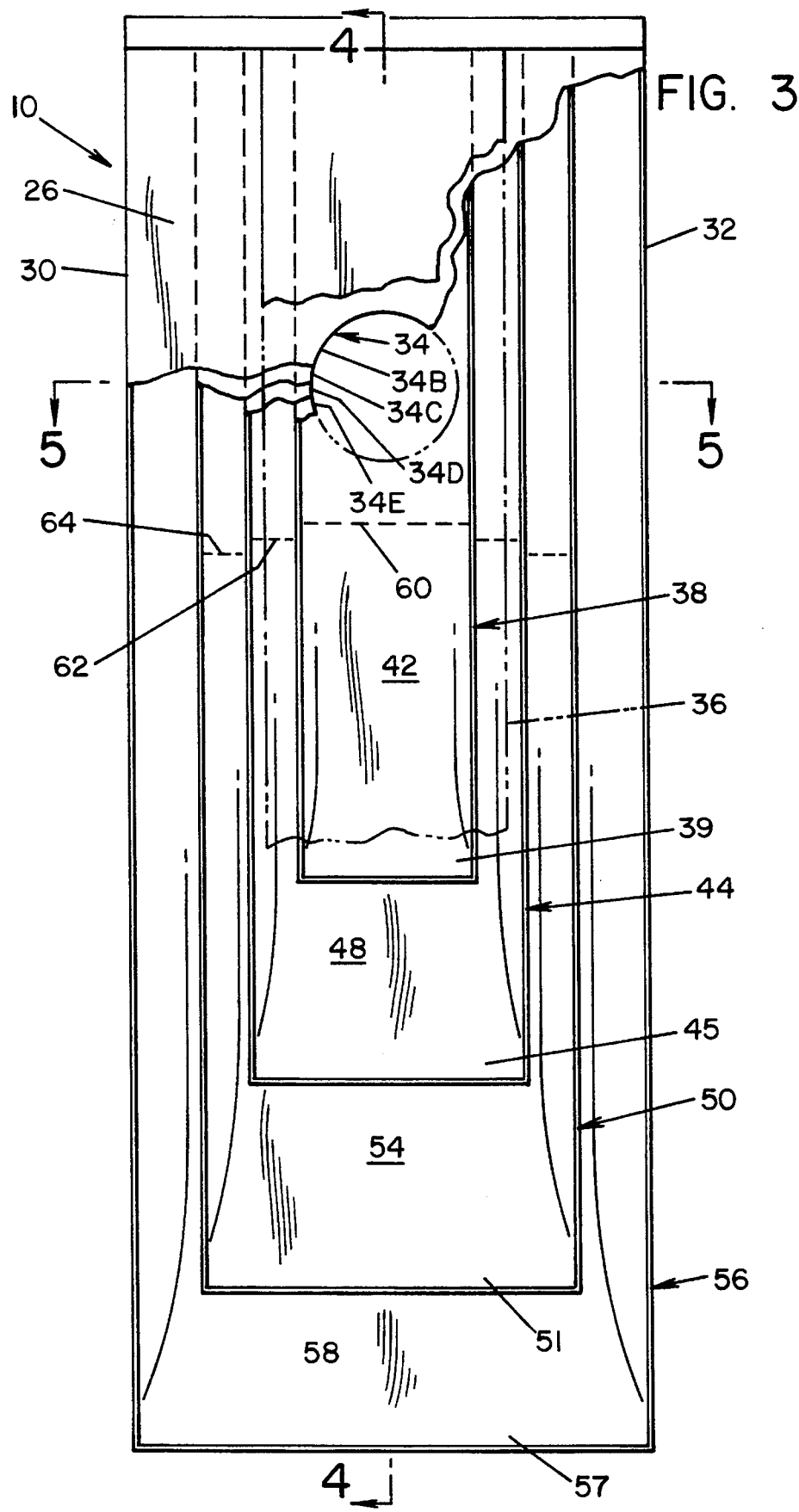
FIG. 3 is an elevational view partly in section showing the bag elements of the filter bag shown in FIG. 2.
Figure 4:
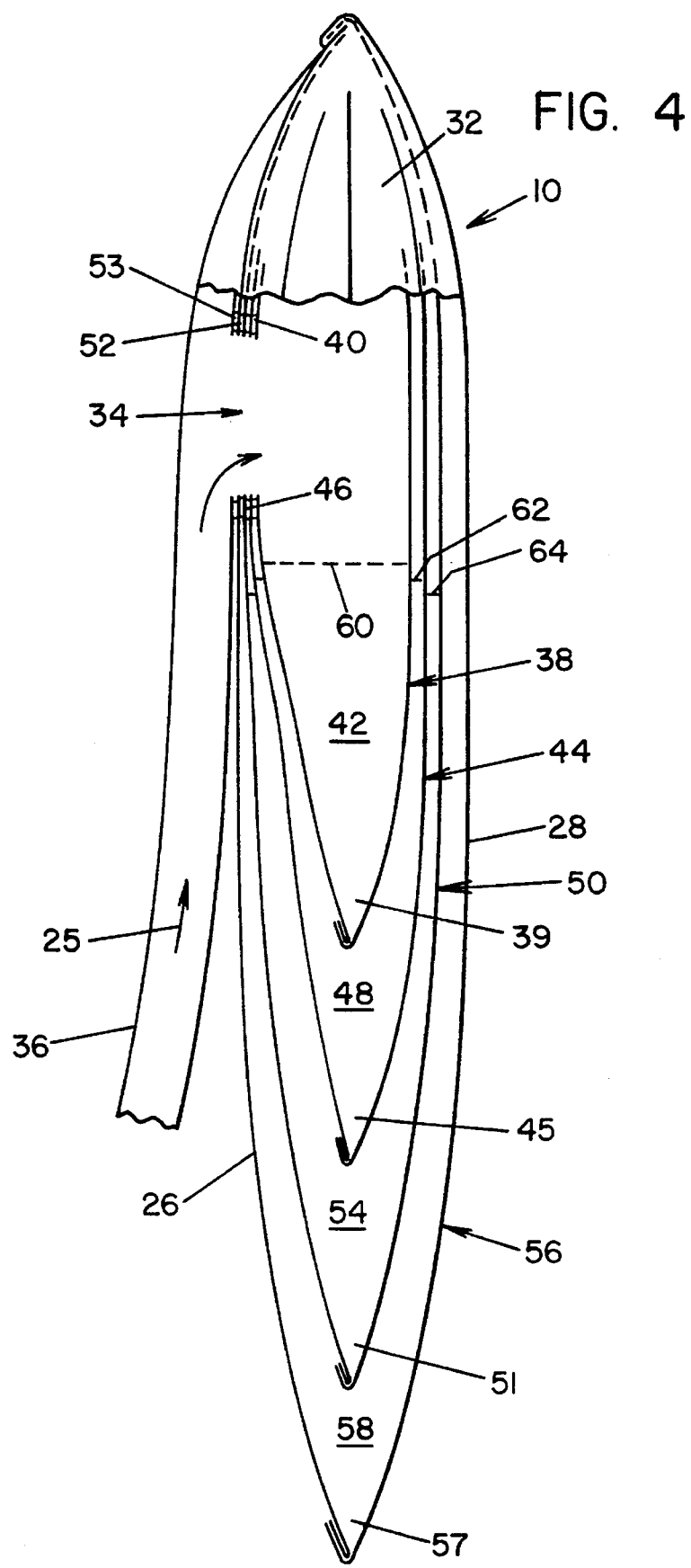
FIG. 4 is a side elevational view of the filter bag in section, taken though line 4—4 in FIG. 3.

Referring now to FIGS. 3–5, filter bag 10 is comprised of an inner bag element 38 defining an interior space 42 having a bottom region 39. Bag element 38 and the other bag elements 44 and 50 described hereinafter are closed except for the air inlet opening thereinto and the bag elements may have smooth sides or include pleats, as shown, to increase the surface area available for filtering particulate matter from discharge 25. Filter bag 10 further includes a first middle bag element 44 defining an interior space 48 having a bottom region 45. Bag element 38 is disposed in interior space 48 of first middle bag element 44 such that opening 34E in element 38 is coaxially aligned with opening 34D in element 44. A layer of adhesive 40 is placed between elements 38 and 44 around openings 34E and 34D to form an airtight seal between the elements in the vicinity of the openings.

Filter bag 10 further comprises a second middle bag element 50 defining an interior space 54 having a bottom region 51. Bag element 44 is disposed within interior space 54 such that opening 34C in element 50 is coaxially aligned with openings 34D and 34E in elements 44 and 38, respectively. A layer of adhesive 46 around opening 34C forms a airtight seal between elements 50 and 54 in the vicinity of opening 34C. Outer bag element 56 defines an interior space 58 having a bottom region 57. Bag element 50 and bag elements 44 and 38 therein, are disposed within space 58 such that opening 34B in bag element 56 is coaxially aligned with openings 34C, 34D and 34E. A band of adhesive 52 disposed around opening 34B serves to form an airtight seal between elements 56 and 50. Hose element 36 attaches to the exterior wall 26 of bag element 56 such that opening 34A in hose element 36 is coaxially aligned with openings 34B, 34C, 34D and 34E. As mentioned above, openings 34A–34E together comprise opening 34 through which discharge 25 passes from hose element 36 to interior 42 of bag element 38. Hose element 36 is sealed to the exterior of element 56 with a band of adhesive 53 about opening 34A to form an airtight seal. Bag element 38 is encircled by a perforation 60, bag element 44 is encircled by a perforation 62 and bag element 50 is encircled by a perforation 64 the purpose of which is described hereinafter.

FIG. 6 shows how the bag elements are assembled one within another with their openings aligned coaxially. Specifically, bag element 38 is disposed within bag element 44 and attached thereto, bag element 44 is disposed within bag element 50 and attached thereto and bag element 50 is disposed within bag element 56 and attached thereto. When the bag elements have all been attached as described, the tops thereof are folded over and sealed so that air entering a bag element through opening 34 must pass through one of the walls of that bag element to escape. Alternately, the top of each bag element could be folded over and sealed individually after the bag element was placed within the next larger bag element.

In operation, a discharge 25 of particle laden air from discharge tube 24 of the vacuum cleaner enters filter bag 10 through opening 34 and passes through each of the bag elements 38, 44, 50 and 56. Each bag element removes some of the particulate matter which comprises the discharge so that the air which exits filter bag 10 is relatively dirt-free. Bag element 38 and the other bag elements are each comprised of a matrix of fibers having spaces therebetween for allowing air to pass through the bag element. Some dirt particles carried in discharge 25 become trapped in the matrix of each bag element as discharge 25 passes therethrough. Bag element 38 and each of the other bag elements have a resistance per unit area with respect to airflow therethrough which is affected by the distance between the fibers which comprise the matrix and the amount of dirt trapped in the matrix. The overall resistance of a given bag element is equal to the resistance per unit area times the surface area of the bag element. As the bag elements are disposed one within another, bag element 38 has the smallest surface area of the bag elements and bag elements 44, 50 and 56 have progressively larger surface areas. Furthermore, as dirt is trapped in the matrix of each bag element, the overall resistance of the bag element increases, which in turn, increases the pressure in the interior thereof. While inner bag element 38 initially captures much of the large matter suspended in discharge 25 and some of the finer matter, some particulate matter, especially the smallest particles, will pass therethrough and may pass through one or both of middle bag elements 44 and 50 and not be trapped until reaching outer bag element 56. Each upstream bag element normally becomes clogged more quickly than the adjacent downstream bag element, in that the air in moving downstream is progressively cleaned by each bag element and because the upstream element has a smaller surface area through which to filter discharge 25 than does the adjacent downstream element.

With reference in particular to FIGS. 3, 4 and 7, discharge 25 initially enters interior 42 of inner bag element 38 under pressure, propelled by the motor of vacuum cleaner 12. As larger particulate matter accumulates in the bottom region 39 of inner bag element 38, as shown in FIG. 7A, and smaller particulate matter adheres to the inner bag element 38, the pressure in interior 42 progressively increases due to the progressively increasing blockage of paths for the air through element 38. The pressure in interiors 48, 54 and 58 of elements 44, 50 and 56 also progressively increases as these layers trap dirt, albeit at a slower rate than in element 38 due to the larger surface areas of these downstream bag elements, and the fact that some particulate matter has been removed by the upstream layers. As bag element 38 traps particulate matter, the openings therethrough become partially blocked thereby allowing bag element 38 to trap smaller particles then it could when completely clean. This causes bag element 38 to become an efficient filter of small particles for a period of time; however, as bag element 38 becomes increasingly clogged, as shown in FIG. 7B, the pressure in interior 42 thereof increases and a progressively increasing amount of energy is required for bag element 38 to filter discharge 25. This energy requirement eventually reaches the point at which an ordinary filter bag would have to be removed from a vacuum cleaner and emptied or discarded. Bag element 38, however, includes perforation 60 which breaks when the pressure in interior 42 reaches a pre-determined level which is related to the amount of material which has been trapped in bag element 38. Element 38, and the dirt contained therein then collapse into the bottom region 45 of first middle bag element 44 as best seen in FIG. 7C.

At this time, first middle bag element 44 becomes the bag element initially receiving discharge 25 entering bag 10. Bag element 44 has a larger surface area than bag element 38, but bag element 44 is also partially clogged by bag element 38 and with particulate matter which was not trapped by inner bag element 38. The combination of larger area and partial blockage results in a resistance to flow similar to that created by bag element 38 when clean. The relative surface areas of the bag elements and/or the permeability of the material thereof, may be selected so that the flow resistance of the entire filter bag immediately after perforation 60 tears is approximately the same as the resistance of the entire filter bag 10 when first attached to vacuum cleaner 12. In the same manner as described above, the middle bag elements 44 and 50 are designed to tear sequentially at perforations 62 and 64 respectively, when the corresponding bag element becomes clogged, as shown in FIGS. 7E and 7G. More particularly in this respect, when bag element 44 becomes clogged and drops off into the bottom 57 of bag element 50, middle bag element 50 becomes the first layer contacted by discharge 26 and discharge 26 is filtered by bags 50 and 56. When bag 50 becomes full and drops into bottom 57 of outer bag 56, bag element 56 continues to filter until its efficiency is decreased to the point at which the entire filter bag is discarded. As will be further appreciated from the above description, the filter bag can be designed so that the remaining bag elements offer the flow resistance of a clean filter bag each time an upstream bag element breaks off from filter bag 10. In this manner a filter bag is provided, the flow resistance of which periodically returns to that of a new filter bag.

Figure 8:
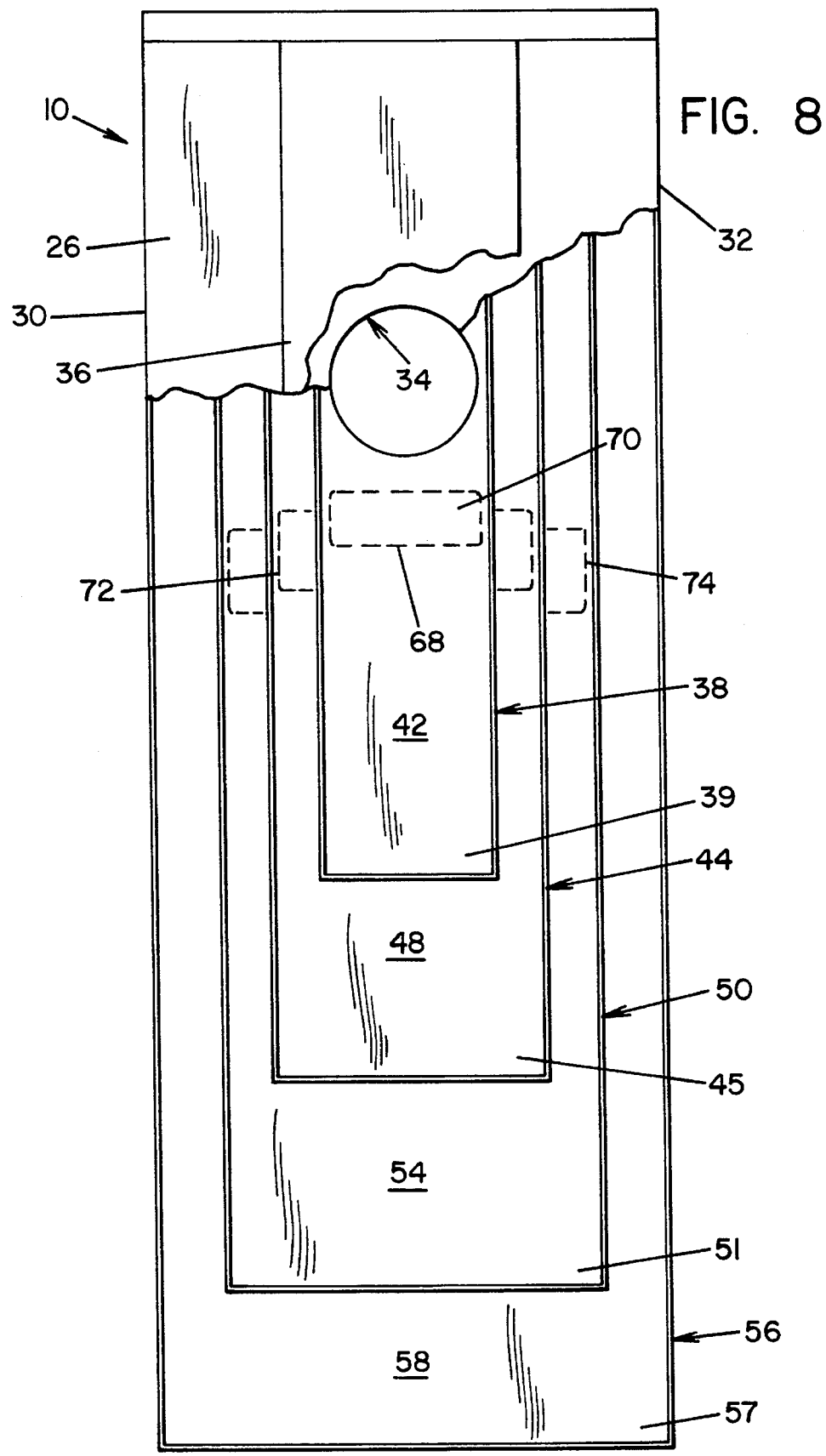

FIG. 8 shows, in conjunction with inner bag element 38, an alternative arrangement for allowing discharge 25 to bypass bag element 38 when element 38 has become clogged with dirt. In this embodiment, bag element 38 includes an opening 68 having a closure 70. In practice, closure 70 may be a portion of bag element 38 set off by perforations, or closure 70 may be a separate piece of filter material secured over opening 68 with an adhesive adapted to release closure 70 when a predetermined pressure occurs within bag element 38. When the pressure in region 42 increases to a certain level, closure 70 will separate from bag element 38 allowing a substantial portion of discharge 25 to bypass bag element 38 and flow directly from opening 34 through region 42 and into interior region 48 of middle bag element 44. In this manner, the majority of discharge 25 will pass through opening 68; heavier material in discharge 25, however, may drop into the interior of bag element 38. In this manner, bag element 38 continues to remove material from discharge 25 even after it becomes too clogged to be an effective filter. This increases the efficiency of filter bag 10 by keeping larger material from clogging bag element 44 so that its filtering ability is not diminished. Middle bag elements 44 and 50 can also be provided with this structure, as indicated by broken lines 72 and 74, respectively. Thus, in this embodiment, bag elements 38, 44 and 50 do not detach from the rest of filter bag 10 but, rather, open and thus are prevented from interfering with the flow of discharge 25 once they have become clogged with dirt. The bypass structures of this embodiment could, of course, be used on certain bag elements while the structure of the first embodiment is used on other elements.

Other arrangements for progressively creating a succession of filtering stages can be devised without going beyond the scope of the present invention. Such other arrangements or modifications of the embodiments disclosed herein will be obvious and are intended to be included within the scope of this invention.

Having described the subject invention, what is claimed is:

1. A vacuum cleaner filter bag comprising inner bag means and outer bag means for filtering a discharge from a vacuum cleaner, means interconnecting said inner and outer bag means with said discharge for said discharge to be sequentially filtered by said inner and then said outer bag means, and pressure-responsive bypass means at a selected location for bypassing said discharge from said inner bag means to said outer bag means.

2. A vacuum cleaner filter bag according to claim 1, wherein said inner bag means includes a plurality of inner bags within said outer bag means, said plurality of inner bags being arranged in series with respect to the direction of said discharge.

3. A vacuum cleaner filter bag according to claim 1, wherein said means responsive to said discharge includes means rupturable to provide an opening from said inner bag means to said outer bag means.

4. A vacuum cleaner filter bag according to claim 3, wherein said inner bag means includes wall means and said opening is through said wall means.

5. A vacuum cleaner filter bag according to claim 3, wherein said inner bag means includes first and second bag portions connected by said rupturable means.

6. A vacuum cleaner filter bag comprising multiple, serially arranged inner bag elements and an outer bag element for serially filtering particulate matter from a particulate matter laden discharge from a vacuum cleaner, each of said inner bag elements including bypass means at a selected location for bypassing said discharge to the succeeding inner bag element when said each inner bag element has filtered a selected amount of said discharge.

7. A vacuum cleaner filter bag according to claim 6, wherein each of said inner bag elements and said outer bag element comprises a generally tubular side wall and a bottom wall.

8. A vacuum cleaner filter bag according to claim 7, wherein each said bypass means is responsive to a given pressure within the corresponding one of said inner bag elements.

9. A vacuum cleaner filter bag comprising multiple, serially arranged inner bag elements and an outer bag element, each of said inner and outer bag elements comprising a generally tubular side wall and a bottom wall, for serially filtering particulate matter from a particulate matter laden discharge from a vacuum cleaner, each of said inner bag elements including bypass means for bypassing said discharge to the succeeding inner bag element when each said each inner bag element has filtered a selected amount of said discharge, wherein each said inner bag element comprises a perforation encircling the side wall thereof, said perforation being severable to produce an opening.

10. A vacuum cleaner filter bag according to claim 9, wherein said bypass means comprises at least one sealed opening in the side wall of each of said inner bag elements.

11. A vacuum cleaner filter bag having multiple inner bag elements and an outer bag element each for filtering particles from a particle-laden flow of air from vacuum cleaner discharge means, means for attaching said outer bag element and said inner bag elements to said discharge means, each of said inner bag elements comprising a first portion fixed relative to said discharge means and a second portion detachably secured to said first portion by perforations.

12. A vacuum cleaner filter bag according to claim 11, wherein each said second portion comprises a major portion of the corresponding inner bag element.

13. A vacuum cleaner filter bag according to claim 11, wherein said flow of air provides a positive pressure within each of said inner and outer bag elements, said pressure increasing in each of said inner and outer bag elements as each of the bag elements traps said particles, said second portion of each of said inner bag elements being adapted to detach from said fixed portion when the pressure within the corresponding inner bag element reaches a selected level.

14. A vacuum cleaner filter bag according to claim 11, wherein said second portions of said inner bag elements are detachably connected to said first portions by perforations.

15. A vacuum cleaner filter bag comprising multiple bag elements for serially filtering particulate matter from a particle laden air discharge from a vacuum cleaner, said multiple bag elements including an outer bag element, at least one middle bag element and an inner bag element, said multiple bag elements being connected for said air discharge to flow in sequence through said inner bag element, said middle bag element and said outer bag element, each of said bag elements having a corresponding surface area and comprising a matrix for trapping said particulate matter as said discharge passes through said elements in said sequence, each of said elements having a resistance to air flow therethrough, said resistance for each of said bag elements having an initial value which increases as particulate matter is trapped in the matrix of the corresponding bag element, and said inner bag element and said at least one middle bag element including means for bypassing at a selected location said air discharge in sequence from said inner bag element to said at least one middle bag element and from said at least one middle bag element to said outer bag element when the resistances of said inner bag element and said middle at least one bag element respectively reach a selected value.

16. A vacuum cleaner filter bag according to claim 15, wherein each of said inner and said at least one middle bag element includes rupturable means for rupturing when the resistance of the corresponding bag element reaches said predetermined level to open the corresponding bag element for flow of said air discharge therethrough.

17. A vacuum cleaner filter bag according to claim 16, wherein the sum of said initial values of said resistances has a first value, and the sum of said resistances has a second value immediately after each of said rupturable means ruptures, said second value being approximately equal to said first value.

18. A vacuum cleaner filter bag having multiple inner bag elements and an outer bag element each for filtering particles from a particle-laden flow of air from vacuum cleaner discharge means, and means for attaching said outer bag element and said inner bag elements to said discharge means, each of said inner bag elements comprising a first portion fixed relative to said discharge means and a second portion detachably secured to said first portion.

19. A vacuum cleaner filter bag comprising inner bag means and outer bag means for filtering a discharge from a vacuum cleaner, means interconnecting said inner and outer bag means with said discharge for said discharge to be sequentially filtered by said inner and then said outer bag means, and rupture means at a selected location on said inner bag means for rupturing after a selected amount of discharge has been filtered by said inner bag means.

\* \* \* \* \*